United States Patent
Dalal et al.

(10) Patent No.: US 8,700,819 B2
(45) Date of Patent: Apr. 15, 2014

(54) HOST DEVICE SUSPENDING COMMUNICATION LINK TO CLIENT DEVICE BASED ON CLIENT DEVICE NOTIFICATION

(75) Inventors: Anand Dalal, San Jose, CA (US); Haining Zhang, San Jose, CA (US); Mitchell D. Adler, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/044,405

(22) Filed: Mar. 9, 2011

(65) Prior Publication Data

US 2012/0233361 A1  Sep. 13, 2012

(51) Int. Cl.
  *G06F 13/00*  (2006.01)
  *G06F 3/00*  (2006.01)
  *G06F 13/24*  (2006.01)

(52) U.S. Cl.
  USPC ............. 710/32; 710/36; 710/47; 710/260; 710/268; 709/227; 709/228; 709/237

(58) Field of Classification Search
  None
  See application file for complete search history.

(56) References Cited

U.S. PATENT DOCUMENTS

| | | | |
|---|---|---|---|
| 4,209,841 A * | 6/1980 | Bambara et al. | 710/34 |
| 5,708,834 A * | 1/1998 | Sasaki et al. | 709/203 |
| 6,272,644 B1 * | 8/2001 | Urade et al. | 713/320 |
| 6,493,782 B1 * | 12/2002 | Verdun et al. | 710/300 |
| 6,523,073 B1 * | 2/2003 | Kammer et al. | 710/48 |
| 2003/0028697 A1 | 2/2003 | Nguyen | |
| 2003/0212844 A1 * | 11/2003 | Wang et al. | 710/266 |
| 2004/0054822 A1 * | 3/2004 | Biran et al. | 710/15 |
| 2004/0168052 A1 * | 8/2004 | Clisham et al. | 713/153 |
| 2008/0104422 A1 | 5/2008 | Mullis et al. | |
| 2008/0180743 A1 * | 7/2008 | Uruta et al. | 358/1.15 |
| 2009/0077277 A1 * | 3/2009 | Vidal et al. | 710/46 |
| 2009/0187670 A1 | 7/2009 | Lee | |
| 2009/0199031 A1 | 8/2009 | Zhang et al. | |
| 2010/0162022 A1 * | 6/2010 | Kim et al. | 713/324 |

FOREIGN PATENT DOCUMENTS

EP    2453362 A2    5/2012

OTHER PUBLICATIONS

International Search Report mailed on Jun. 5, 2012 for PCT Patent Application No. PCT/US2012/027334, 4 pages.
Written Opinion of the International Searching Authority mailed on Jun. 5, 2012 for PCT Patent Application No. PCT/US2012/027334, 5 pages.
Search/Examination report mailed Jul. 23, 2012, GB1203875.8, 7 pages.

* cited by examiner

*Primary Examiner* — Michael Sun
(74) *Attorney, Agent, or Firm* — Kilpatrick Townsend & Stockton LLP

(57) ABSTRACT

A communication link between a host device and a client device can be suspended based on a suspend request or notification provided by the client device. The suspend request can be transmitted by a client device to a host device if the client device determines that suspension is appropriate, and can be sent in response to receiving a polling request from the host device. After receiving a suspend request, the host device can initiate an operation to suspend the communication link between the devices.

21 Claims, 13 Drawing Sheets

HOST DEVICE SUSPENDING COMMUNICATION LINK TO CLIENT DEVICE BASED ON CLIENT DEVICE NOTIFICATION

BACKGROUND

The present disclosure relates generally to power-saving techniques for computing devices, and more particularly to techniques for suspending a communication link or channel between a host device and a client device based on a request or notification transmitted by the client device.

Computing devices, e.g., personal computers, have been in use for several decades. Computing devices are used for performing various tasks, from the simple to some of the most complex tasks. Computing devices can be generally categorized into portable, e.g., a laptop PC or a PDA, and non-portable, e.g., a desktop PC.

In the past decade, portable computing devices have gained popularity due to their portability and ability to manage multiple tasks. For example, a portable computing device, e.g., a personal digital assistant, can provide the ability to check and respond to emails, manage meetings, display graphics and video, and play music.

Typically, portable computing devices are powered by batteries or similar power sources with limited amounts of energy. In order to prolong device usage before recharging or replacement of a power source (e.g., battery), power-saving techniques have been developed.

SUMMARY

Certain embodiments of the present invention provide techniques for suspending a communication link between a host device and a client device based on a suspend request or notification provided by the client device. In certain embodiments, the client device can transmit the suspend request in response to a polling request received from the host device. In some embodiments, the polling request can be sent by the host device at the hardware layer. More specifically, the polling request can be sent without processing by an operating system or application (software layer) executed by a processor of the host device. In some embodiments, the host device can initiate an operation to suspend the communication link upon receiving a suspend request from the client device.

One aspect of the invention relates to client devices and methods of operation thereof. In some embodiments, a client device can enable operation with a host device (e.g., applications processor of a smartphone, etc.) via a communication link. During operation, the client device can determine whether suspension of the communication link is appropriate. If the client device determines that the communication link should be suspended, the client device can transmit a suspend request to the host device.

For example, a client device can include a controller and an input/output (I/O) interface connected to the controller. The I/O interface can be configured to be connected to a host device via a communication link. The controller can be configured to send configuration information to the host device via the I/O interface, determine if suspension of the communication link between the devices is appropriate, receive polling requests from the host device, and send suspension information (e.g., suspend requests) to the host device via the I/O interface indicating whether the communication link between the devices should be suspended.

Another aspect of the invention relates to host devices and methods of operation thereof. In some embodiments, a host device can enable operation with a client device (e.g., external speaker, digital signal processing (DSP) co-processor for mobile telephone network communications, DSP co-processor for GPS communications, WiFi chip, Bluetooth chip, etc.) via a communication link. The host device can periodically send polling requests to the client device. The host device can further initiate suspension of the communication link based on a suspend request received from the client device.

For example, a host device can include a processor, a host controller, and a client input/output (I/O) interface. The processor can be connected to the host controller. The host controller, in turn, can be connected to the client I/O interface. The client I/O interface can be configured to connect to a client device via a communication link. The processor can be configured to receive configuration information from the client device and enable operation with the client device. The host controller can be configured to send polling requests to the client device, and receive suspension information (e.g., suspend requests) from the client device. The processor can also be configured to initiate suspension of a communication link in response to a suspend request.

The following detailed description together with the accompanying drawings will provide a better understanding of the nature and advantages of the present invention.

DETAILED DESCRIPTION

Figure 1:
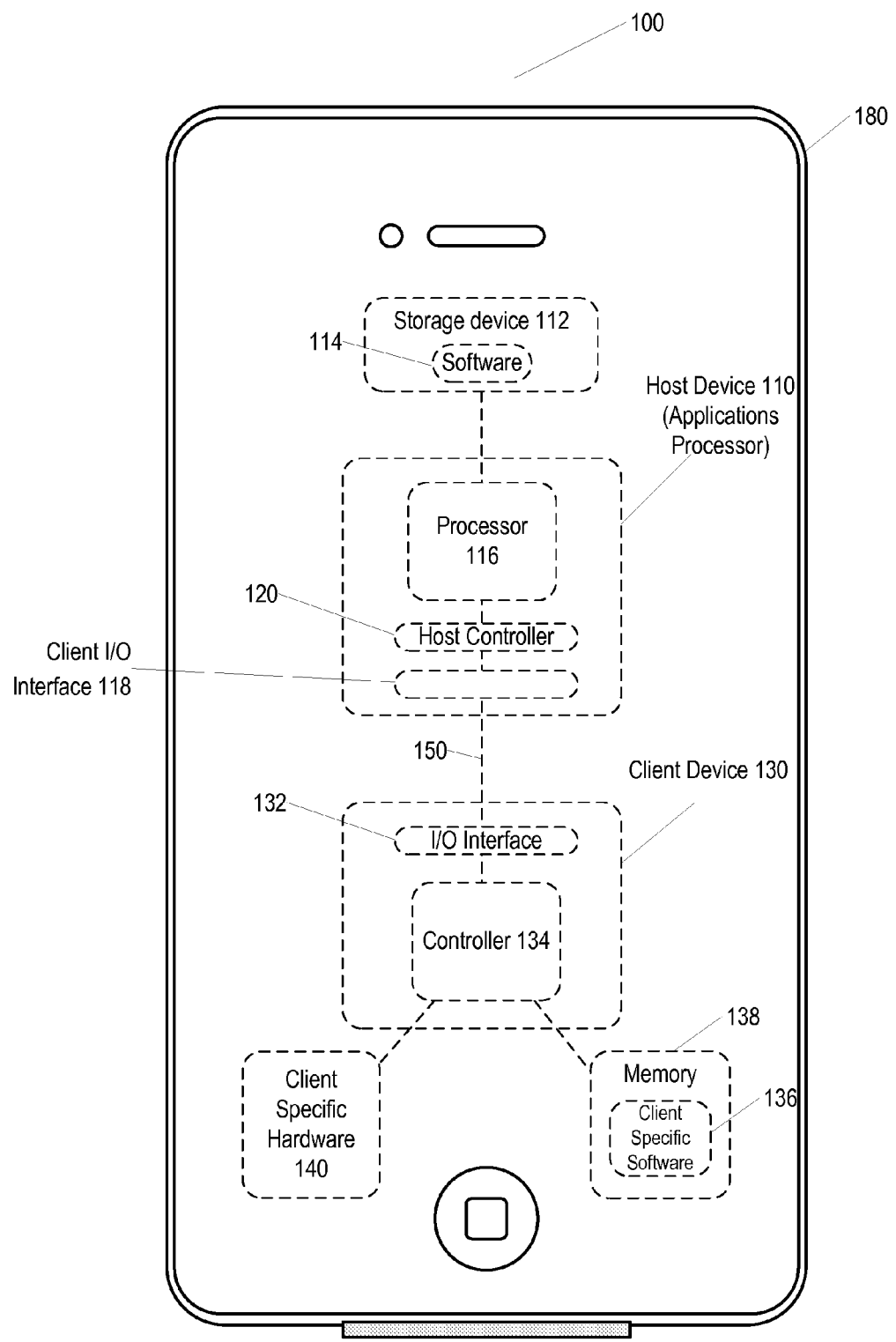
FIG. 1 illustrates a system including a host device connected to a client device according to an embodiment of the present invention.

Some embodiments of the present invention provide techniques for suspending (e.g., placing in low power mode) a communication link or channel between a host device and a client device based on a suspend request transmitted by the client device. In some embodiments, the suspend request can be transmitted in response to a polling request provided by the host device. In certain embodiments, the polling request can be sent by a host controller of the host device at the hardware layer. For example, the host controller can transmit a polling request without processing by an operating system or application (software layer) executed by a processor of the host device. In some embodiments, a host device can initiate an operation suspending a communication link between the host device and client device in response to receiving a suspend request. In some embodiments, communication of the suspend request can be facilitated by a communication protocol, such as the universal serial bus (USB) protocol.

The USB protocol, developed in the 1990s, can facilitate communications between a host device and one or more connected client devices. The USB protocol is an asymmetrical or host-centric communication protocol. As such, communications and transactions facilitated by the USB protocol are initiated by the host device. For example, under the USB protocol, only a host device can perform suspension of a communication link with a client device. The client device can neither directly suspend the communication link nor indirectly suspend the communication link through transmitting a suspend request.

As discussed, certain embodiments of the present invention permit the transmission of a suspend request to a host device from a client device using the USB protocol. By permitting a client device to request suspension of its communication link with a host device, power usage can be effectively managed and reduced. More specifically, in some circumstances, a client device can assess its communication requirements much more accurately than its host device. For example, a client device can better determine periods of time where it will not be communicating with the host device (e.g., periods when it is idle). As a result, the client device can better recognize when suspension of its communication link to its host device is appropriate.

In certain embodiments, a host device can be any suitable computing device without limitation. In some embodiments, a host device can be a component of a personal computer, laptop computer, tablet device, multimedia device, cellular phone, smartphone, global positioning system (GPS) device, gaming device, multi-function device, a smart hub device that permits two or more devices to communicate with one another, and/or the like. For example, a host device can be a single chip (integrated circuit) applications processor within a smartphone device that is configured to interact with various other co-processors or components of the smartphone device. In other embodiments, a host device can be a personal computer, laptop computer, tablet device, multimedia device, cellular phone, smartphone, global positioning system (GPS) device, gaming device, multi-function device, a smart hub that permits two or more devices to communicate with one another, and/or the like.

In certain embodiments, a client device can be any suitable device capable of communicating with a host device without limitation. In some embodiments, a client device can be a component of a personal computer, laptop computer, tablet device, multimedia device, cellular phone, smartphone, global positioning system (GPS) device, gaming device, multi-function device, wireless communications device, modem, external speaker, external display, input device, printing device, and/or the like. For example, a client device can be a single chip (integrated circuit) co-processor that manages hardware providing mobile telephone network communications (voice and/or data), WiFi communications (e.g., IEEE 802.11 family standards), and/or near field technology communications (e.g., Bluetooth). In other embodiments, a client device can be a tablet device, multimedia device, cellular phone, smartphone, global positioning system (GPS) device, gaming device, multi-function device, wireless communications device, modem, external speaker, external display, input device, printing device, and/or the like.

In certain embodiments, a host device can communicate with a client device via a communication link. In some embodiments, a host device can communicate with a client device via a path that includes more than one communication link. For example, a host device can be connected to a hub device (e.g., a device that allows a single connection from a host device to connect to multiple client devices) via a first communication link. The hub device can then be connected to a client device via a second communication link. During operation, communications between the host and client devices can pass through the first communication link, hub device, and second communication link.

The following description primarily refers to communications using the USB protocol. However, one skilled in the art will appreciate that the suspension techniques disclosed in this specification are equally applicable to other types of communication protocols. The following descriptions also primarily refer to communications over USB and USB High-Speed Inter-Chip (HSIC) connections. However, one skilled in the art will appreciate that the suspension techniques disclosed in this specification are equally applicable to other types of connections, such as wired and wireless connections.

FIG. 1 illustrates a system 100 including a host device connected to a client device according to an embodiment of the present invention. The system shown in FIG. 1 includes a host device 110, a client device 130, a communication link 150, storage device 112, client specific hardware 140, and memory 138.

In some embodiments, host device 110, client device 130, storage device 112, client specific hardware 140, and memory 138 can be wholly or partially enclosed within a housing 180. Housing 180 can be made of any suitable material. For instance, housing 180 can be made of plastic, metal, glass, ceramics, wood, and/or the like. In certain embodiments, host device 110 and client device 130 can be implemented on or embedded in the same printed circuit board (e.g., motherboard) within housing 180. For example, host device 110 and client device 130 can each be a chip embedded in the motherboard of a multi-function device. The communication link 150 connecting host device 110 and client device 130 can be, for example, one or more traces on a printed circuit board (PCB).

In some embodiments, host device 110 can include a processor 116, a client I/O interface 118, and a host controller 120. In some embodiments, host device 110 can be implemented as one or more integrated circuits (including e.g., a conventional microprocessor or microcontroller). For example, host device 110 can be a single chip applications processor that integrates processor 116, client interface 118 and host controller 120. Host device 110 can further be connected to storage device 112 in any suitable manner.

Processor 116, which can be implemented as one or more integrated circuits, can control the operation of host device 110. For example, in response to user input signals provided via a user interface (not shown), processor 116 can perform various tasks such as selecting and playing media assets that can be stored in storage device 112, interacting with the client devices to access various client device functionalities (e.g., accessing a mobile telephone network, the Internet, local area network, external speakers, external displays, and/or the like), executing various software programs 114 (e.g., operating systems and applications) residing on storage device 112, and so on. In some embodiments, communications can be facilitated based on a communication protocol, such as the USB protocol.

Client I/O interface 118 can include a number of signal paths configured to carry various signals between host device 110 and client device 130. In some embodiments, client I/O interface 118 can include a number of signal paths sufficient for facilitating communication based on a communication protocol. For example, client I/O interface 118 can include a number of signal paths suitable for communication using the USB protocol. In some embodiments, client I/O interface 118 can be an HSIC interface. An HSIC interface is a standard interface type that permits communication using the USB protocol over short distances (e.g., up to about 10 cm, distance scales typical between components of handheld portable computing devices). Because HSIC interfaces are optimized for communications over short distances, HSIC interfaces have reduced power requirements, cost, complexity, and manufacturing risk as compared to more traditional USB interfaces. HSIC interfaces are used, for example, to enable communication between chips on the same printed circuit board.

In certain embodiments, host device 110 can include host controller 120, which can facilitate communication with client device 130 based on any suitable manner of transferring data. For example, host controller 120 can manage communications with client device 130 via client I/O interface 118. In certain embodiments, host controller 120 can communicate with client device 130 based on interrupt type data transfers. For example, host controller 120 can be configured to periodically poll client device 130. Host controller 120 can further be configured to receive suspension information from client device 130. Suspension information can include suspend requests, suspension notifications, negative acknowledgement messages (NAKs), and/or the like. In some embodiments, host controller 120 can send polling requests to client device 130 without the aid of processor 116 (e.g., without using processing cycles of processor 116). In some embodiments, the sending of polling requests can be performed by host controller 120 at the hardware layer. For example, polling requests can be sent by host controller 120 without processing by an operating system or application (i.e. software layer) executed by processor 116. In some embodiments, host controller 120 can determine whether suspension information received from client device 130 requests suspension of communication link 150 at the hardware layer. In certain embodiments, if host controller 120 receives an indication that a suspension is not requested (e.g., through receiving a NAK message), host controller 120 can continue periodically polling client device 130. In some embodiments, if host controller 120 receives an indication that suspension is requested, host controller 120 can notify an operating system or application executed by processor 116.

Storage device 112 can be implemented, e.g., using disk, flash memory, or any other non-volatile storage medium. Storage device 112 can store software programs 114 that are executable by processor 116, including operating systems and related program code (not explicitly shown) that can be used in managing communications with various client devices, e.g., as described below and/or software programs. Storage device 112 can also store any other type of information such as various media assets, information about a user's contacts (names, addresses, phone numbers, etc.), scheduled appointments and events, notes, and/or other information.

Software programs 114 (also referred to as software herein) can include any program executable by processor 116. In some embodiments, certain software programs can be installed on host device 110 by its manufacturer, while other software programs can be installed by a user. Examples of software programs 114 can include operating systems, productivity applications, video game applications, personal information management applications, applications for playing media assets and/or navigating a media asset database, applications for controlling a telephone interface to place and/or receive calls, and so on. Certain software programs 114 can provide communication with and/or control of client devices, and certain software programs 114 can be responsive to control signals or other input from client device 130.

In some embodiments, client device 130 can include an I/O interface 132, and controller 134. In some embodiments, client device 130 can be implemented as one or more integrated circuits. For example, client device 130 can be a single chip DSP co-processor integrating I/O interface 132 and controller 134. In some embodiments, client device 130 can be connected to memory 136 and client specific hardware 140.

I/O interface 132 can include a number of signal paths configured to carry various signals between client device 130 and host device 110. In some embodiments, I/O interface 132 can include a number of signal paths sufficient for facilitating communication based on a communication protocol. For example, I/O interface 132 can include a number of signal paths suitable for communication using the USB protocol. In some embodiments, I/O interface 132 can be an HSIC interface.

Controller 134 can execute program code to manage the various functions of client specific hardware 140, such as managing mobile phone communications (voice and/or data), WiFi communications, near field (e.g., Bluetooth) communications, digital audio decoding, analog or digital audio and/or video processing, processing of user input, controlling the functionality of client specific hardware 140 and the like. Controller 134 can also manage communication with host device 110 via I/O interface 132. For example, telephone voice data from client specific hardware 140 can be received by controller 134 and subsequently relayed to host device 110. In some embodiments, controller 134 can determine whether a communication link between client device 130 and host device 110 is to be suspended. For example, client device 130 can manage the operation of client specific hardware 140. Client specific hardware 140 can be configured to, for instance, provide mobile telephone network communications functionality to host device 110 via client device 130. During operation, controller 134 can determine that communication with a mobile telephone network is no longer required (e.g., no further communications from the network is expected), and that accordingly the communication link between client device 130 and host device 110 can be suspended. In some embodiments, controller 134 can transmit or cause the transmission of a suspend request to host device 110.

Memory 136 can be implemented using any type of memory, disk, or other storage medium that can store program code and/or data. For example, memory 136 can store client device specific software 138 that can provide instructions for controller 134 to interact with client specific hardware 140. Memory 136 can additionally store client device configuration data (e.g., USB protocol descriptors) that can be provided to host device 110. In some embodiments, client device 130 can receive information (e.g., user input, metadata, and/or application data) from host device 110, and such information can also be stored in memory 136.

Client specific hardware 140 can represent any hardware needed to enable any desired functionality.

In some embodiments, client specific hardware 140 can include network and/or communication interfaces. The network and/or communication interfaces can provide voice and/or data communication capability for host device 110. In some embodiments, the network and/or communication interfaces can include transceivers (e.g., using mobile telephone technology such as GSM or CDMA, advanced data network technology such as 3G or EDGE, WiFi (IEEE 802.11 family standards), Bluetooth, or other mobile communication technologies, or any combination thereof), GPS receiver components, and/or other components for accessing wireless voice and/or data networks. In some embodiments, the network and/or communication interfaces can provide wired network connectivity in addition to or instead of a wireless interface. The network and/or communication interfaces can be implemented using any suitable combination of hardware (e.g., antennas, modulators/demodulators, encoders/decoders, and other analog and/or digital signal processing circuits).

In other embodiments, client specific hardware 140 can include an RF receiver (e.g., for FM, AM, satellite radio, and/or other bands) and/or an RF transmitter (e.g., a short-range transmitter for personal use). In still other embodiments, client specific hardware 140 can include powered speakers, image displays (e.g., LCDs), input devices, printing devices, etc.

In some embodiments, client specific hardware 140 can include components of a user interface. Thus, an application executing on host device 110 can receive user input from client specific hardware 140, provide output to a user via client specific hardware 140, and/or control, interact with, or respond to any operation that client specific hardware is capable of performing.

Accordingly, client specific hardware 140 can encompass any hardware component for which interoperability with a computing and/or communication device can be desirable.

I/O interfaces 118 and 132 can allow host device 110 to be connected to client device 130 via communication link 150. Communication link 150 can enable data to be transferred between host device 110 and client device 130 using any suitable communication protocol (e.g., the USB protocol). In certain embodiments, communication link can be any suitable connection type. For example, communication link 150 can be implemented according to USB or USB HSIC standards. Communication link 150 can further be implemented in any suitable manner. For example, communication link 150 can be implemented as a cable, interconnect wire, pcb trace, connection over a wireless medium, and/or the like.

In some embodiments, communication link 150 can be placed in a suspended or low power mode. Suspending communication link 150 can cause the communication link to use less power relative to when communication link is active (e.g., enabled for communication). For example, when communication link 150 is suspended, it can draw minimal or no power from host device 110.

In some embodiments, client device 130 can draw power from host device 110 via communication link 150. As such, when communication link 150 is suspended, client device 130 can likewise be suspended. In other embodiments, client device 130 can draw power from a source other than host device 110. As a result, client device 130 can remain active while communication link 150 is suspended. It should be noted that in such embodiments, client device 130 can also independently suspend itself.

In certain embodiments, communication link 150 can be switched from a suspended mode to an active mode by either host device 110 or client device 130. Upon activating or "waking up" communication link 150, communication between host device 110 and client device 130 can resume. In some embodiments, host device 110 can initiate a subsequent configuration or "re-enumeration" process with client device 130 upon the activation (i.e. wake up) of communication link 150. In certain embodiments, standard implementations for a USB enumeration process can be used, e.g., implementations compliant with "Universal Serial Bus Specification," version 2.0 dated Apr. 27, 2000. In other embodiments, host device 110 can perform a "re-enumeration" process based on previously cached or stored enumeration information in order to avoid performing a standard enumeration process. Examples of fast enumeration processes that can be used are described in U.S. patent application Ser. No. 13/044,399, filed Mar. 9, 2011, the disclosure of which is incorporated herein by reference in its entirety.

Figure 2:
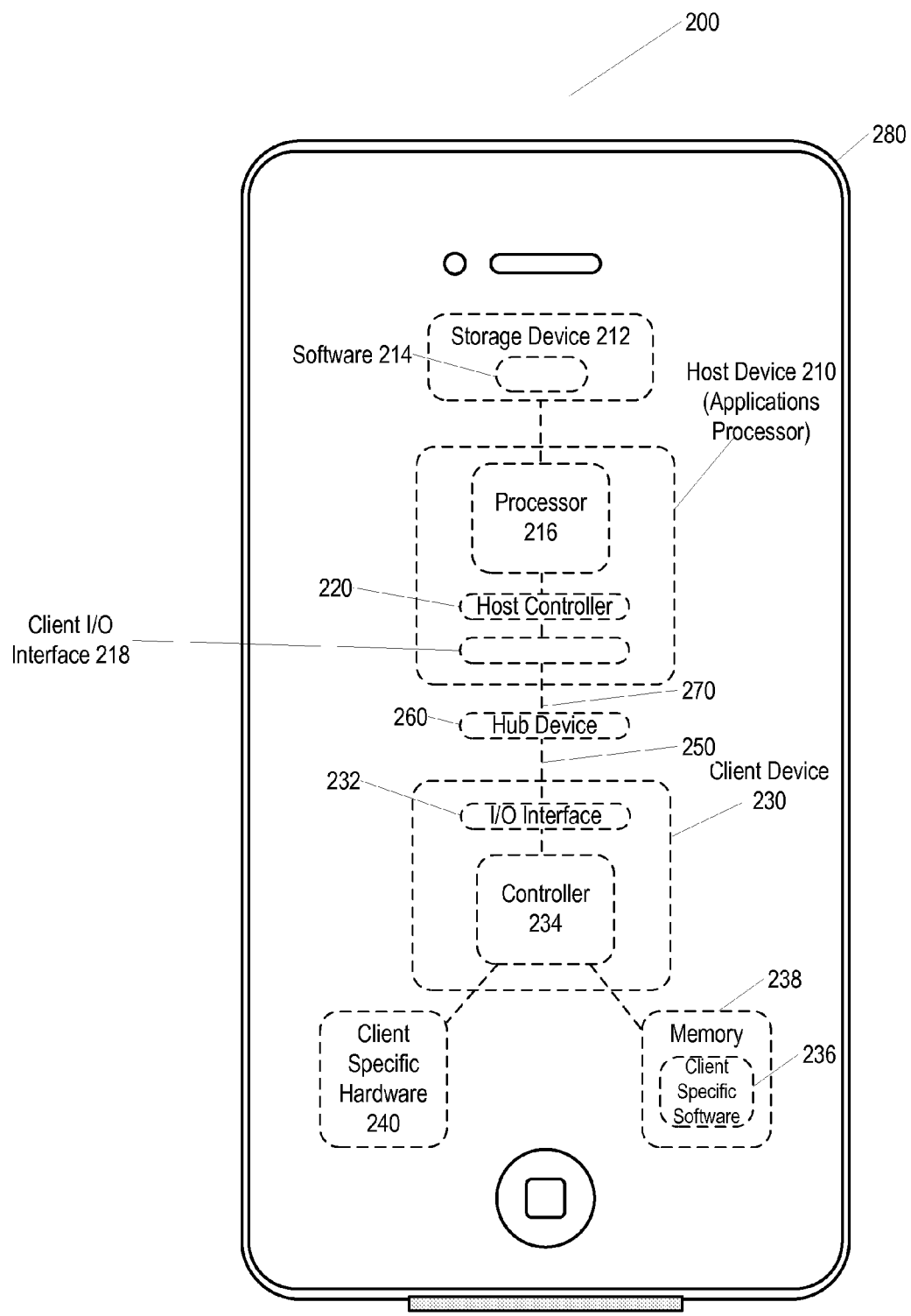
FIG. 2 illustrates a system including a host device connected to a hub device, which is connected to a client device according to an embodiment of the present invention.

Connection between a host device and a client device can be direct of indirect. For example, FIG. 2 illustrates a system 200 including a host device connected to a hub device, which is in turn connected to a client device. Although the system of FIG. 2 shows only one client device, one communication link, one storage device, one client specific hardware, one hub device, and one memory, any suitable number of these entities can be included. The system illustrated in FIG. 2 can be similar to the system illustrated in FIG. 1. Specifically, host device 210 can be similar to host device 110. Storage device 212 can be similar to storage device 112. Software 214 can be similar to software 114. Processor 216 can be similar to processor 116. Host controller 220 can be similar to host controller 120. Client I/O interface 218 can be similar to client I/O interface 118. Client device 230 can be similar to client device 130. I/O interface 232 can be similar to I/O interface 132. Controller 234 can be similar to controller 134. Client specific hardware 240 can be similar to client specific hardware 140. Memory 238 can be similar to memory 138. Client specific software 236 can be similar to client specific software 136. Housing 280 can be similar to housing 180.

FIG. 2 further shows that host device 210 can be connected to hub device 260 via first communication link 270, and client device 230 can be connected to a hub device 260 via second communication link 250. In some embodiments, hub device 260 can be any suitable device capable of connecting multiple client devices (not shown) to a single connection from host device 210. Communications between host device 210 and client device 230 can pass through first communication link 270, hub device 260, and second communication link 250. In certain embodiments, client device 230 can send a request to host device 210 requesting suspension of communication link 250. After receiving the suspend request, host device 210 can suspend either first communication link 270 (e.g., a global suspend that ceases communication with all of the client devices connected via hub device 260) or suspend second communication link 250 (e.g., a selective suspend of the link to a particular client device connected to hub device 260). In certain embodiments, the host device can suspend both the first and second communication links.

Figure 3:
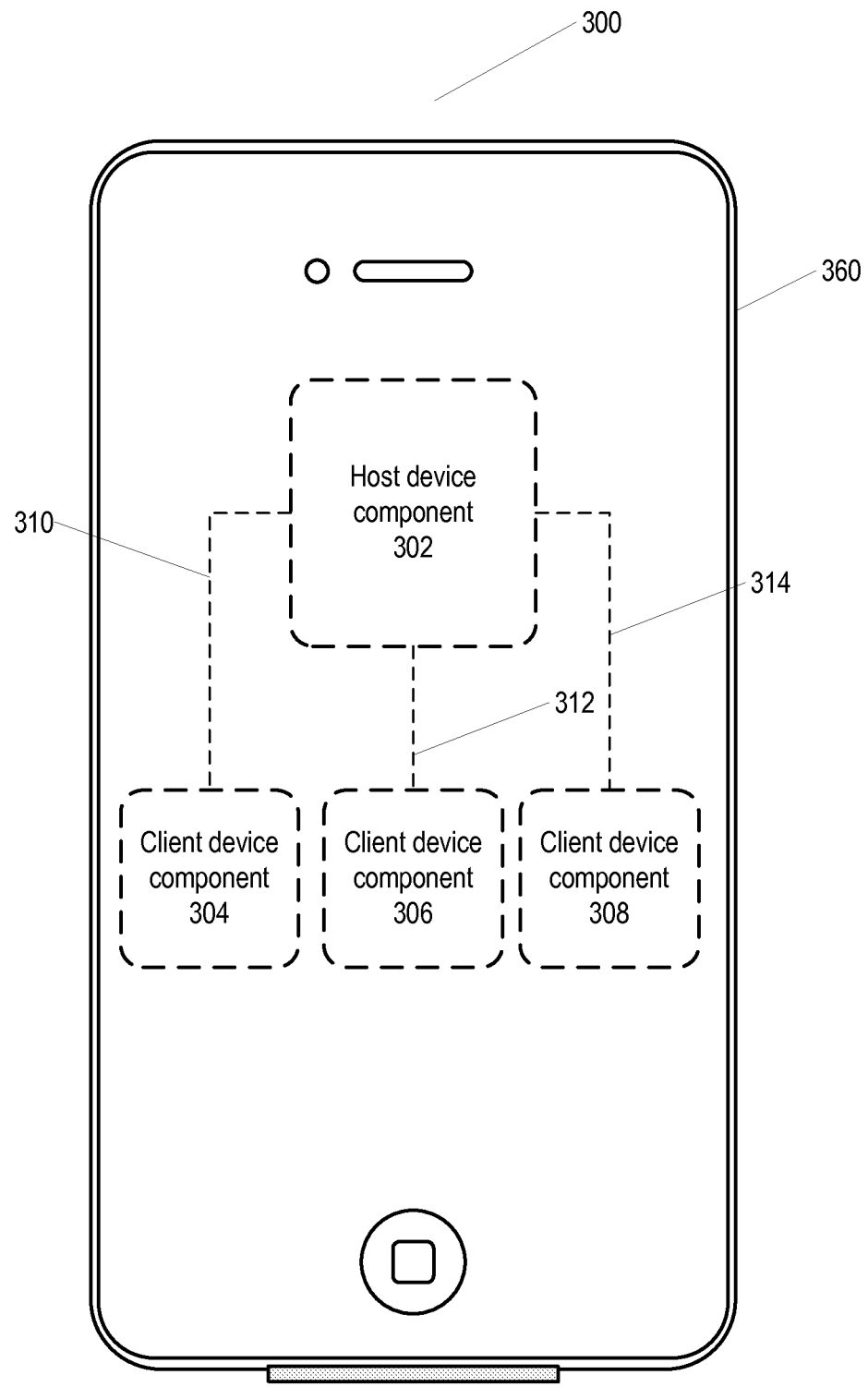
FIG. 3 illustrates a system including a host device connected to multiple client devices according to an embodiment of the present invention.

In some embodiments, a host can be connected to multiple client devices. For example, FIG. 3 illustrates a system 300 including a host device connected to multiple client devices. The system illustrated in FIG. 3 can be similar to the system illustrated in FIG. 1. Specifically, host device 302 can be similar to host device 110. Housing 360 can be similar to housing 180. Client devices 304, 306, and 308 can be each similar to client device 130. Communication links 310, 312, and 314 each can be similar to communication link 150. FIG. 3 further shows that host device 302 can be connected to each of client devices 304, 306, and 308. Host device 302 can communicate with client devices 304, 306, and 308 via communication links 310, 312, and 314 respectively. Each client device can be connected to a different client specific hardware and/or memory (not shown). In some embodiments, the client devices can manage various functionalities provided by their associated client specific hardware (e.g., WiFi communications, mobile telephone network communications, Bluetooth, etc.).

Thus, for example, in a portable computing device, a single host device 302 can communicate with a client device 304 to provide mobile telephone functionality, another client device 306 to provide GPS functionality, and a client device 308 to provide a user interface, etc. Any number of client devices can be connected to a host device either directly or indirectly. In certain embodiments, each of client devices 304, 306, 308 can be configured to transmit suspend requests to host device 302. In some embodiments, only a subset of client devices can be configured to transmit suspend requests.

Figure 4:
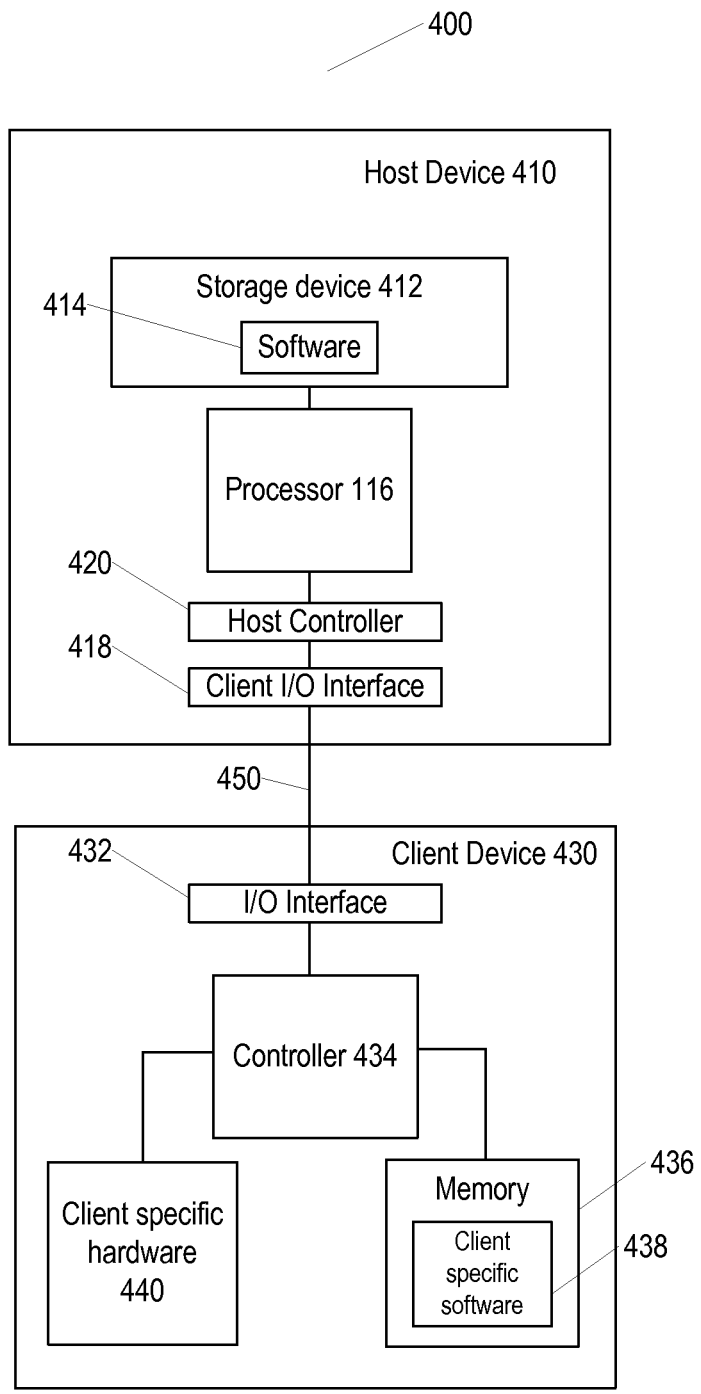
FIG. 4 illustrates an exemplary host device connected to an exemplary client device according to an embodiment of the present invention.

FIG. 4 illustrates a system 400 including a host device connected to a client device according to an embodiment of the present invention. The system illustrated in FIG. 4 can be similar to the system illustrated in FIG. 1. However, in some embodiments, host device 410 and client device 430 are not enclosed in a common housing. For example, host device 410 can be a portable multimedia device and client device 430 can be an accessory, such as an external speaker. In other embodiments, host device 410 and client device 430 can be enclosed in a common housing, but are not embedded in a single PCB.

Referring to FIG. 4, host device 410 can be similar to host device 110. Storage device 412 can be similar to storage device 112. Software 414 can be similar to software 114. Processor 416 can be similar to processor 116. Host controller 420 can be similar to host controller 120. Client I/O interface 418 can be similar to client I/O interface 118. Client I/O interface 418 can be any suitable interface for facilitating communication using the USB or any other communication protocol. For example, client I/O interface 418 can include a connector that can be coupled to a USB cable. Client device 430 can be similar to client device 130. I/O interface 432 can be similar to I/O interface 132. Controller 434 can be similar to controller 134. I/O interface 434 can be any suitable interface for facilitating communication using the USB or any other communication protocol. Client specific hardware 440 can be similar to client specific hardware 140. Memory 438 can be similar to memory 138. Client specific software 436 can be similar to client specific software 136. Communication link 450 can be similar to communication link 150. FIG. 4 further shows that host device 410 can include storage device 412 and client device 430 can include client specific hardware 440 and memory 436.

In some embodiments, host device 410 can be a personal computer, laptop computer, tablet device, multimedia device, cellular phone, smartphone, global positioning system (GPS) device, gaming device, multi-function device, a smart hub that permits two or more devices to communicate with one another, and/or the like.

In certain embodiments, client device 430 can be any suitable device capable of communicating with a host device without limitation. In some embodiments, a client device can be a tablet device, multimedia device, cellular phone, smartphone, global positioning system (GPS) device, gaming controller or input device, multi-function device, wireless communications device, modem, external speaker, external display, camera, printing device, and/or the like.

In some embodiments, communication link 450 can be implemented as a USB cable, serial cable, etc., allowing host and client devices to be connected or disconnected by a user. In certain embodiments, client device 430 can send a request to host device 410 requesting suspension of communication link 450.

Figure 5:
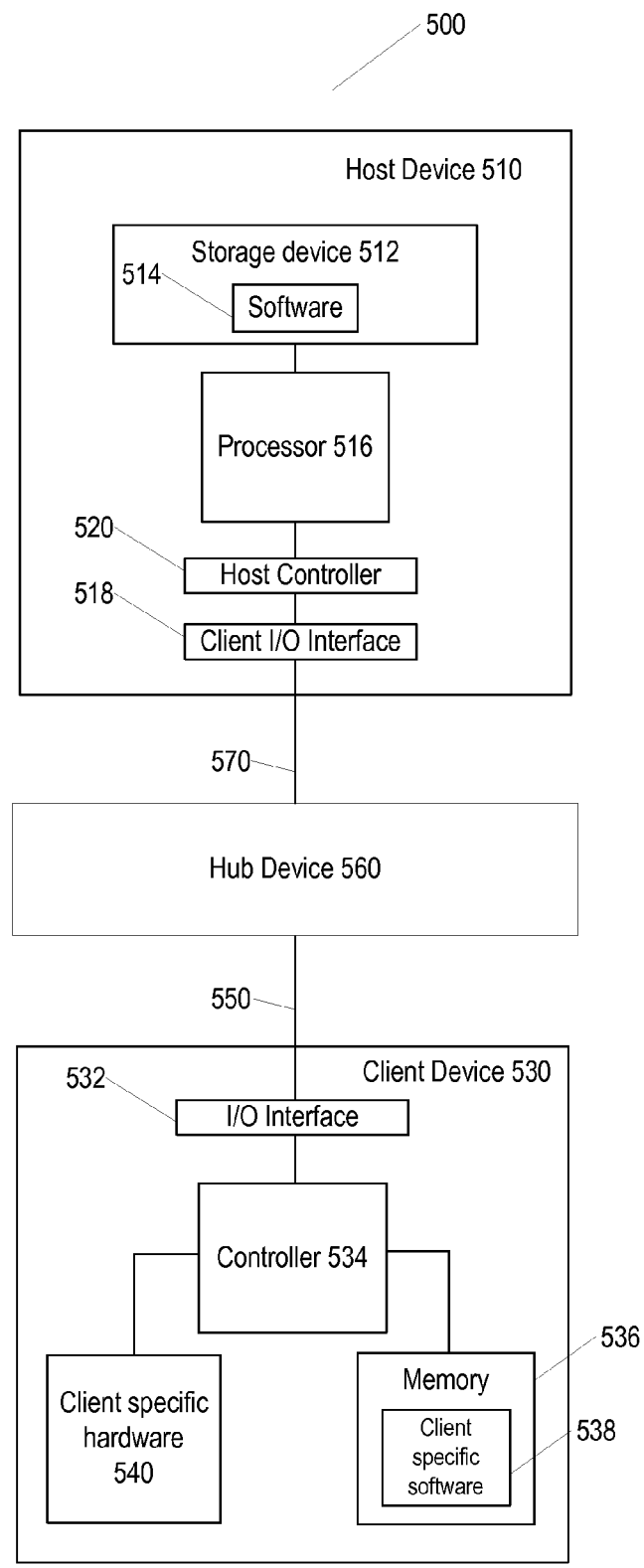
FIG. 5 illustrates an exemplary host device connected to a hub device, which is connected to a client device according to an embodiment of the present invention.

FIG. 5 illustrates a system 500 including a host device connected to a hub device, which is connected to a client device according to an embodiment of the present invention. The system illustrated in FIG. 5 can be similar to the system illustrated in FIG. 2. However, in some embodiments, host device 510, hub device 560 and client device 530 are not enclosed in a common housing. For example, host device 510 can be a portable multimedia device, hub device 560 can be an external smart hub device, and client device 530 can be an accessory, such as an external speaker. In other embodiments, host device 510, hub device 560 and client device 530 can be enclosed in a common housing, but are not embedded in a single PCB.

Referring to FIG. 5, host device 510 can be similar to host device 210. Storage device 512 can be similar to storage device 212. Software 514 can be similar to software 214. Processor 516 can be similar to processor 216. Host controller 520 can be similar to host controller 220. Client I/O interface 518 can be similar to client I/O interface 218. Client I/O interface 518 can be any suitable interface for facilitating communication using the USB or any other communication protocol. For example, client I/O interface 518 can include a connector that can be coupled to a USB cable. I/O interface 532 can be similar to I/O interface 232. I/O interface 532 can be any suitable interface for facilitating communication using the USB or any other communication protocol. Controller 534 can be similar to controller 234. Client specific hardware 540 can be similar to client specific hardware 240. Memory 538 can be similar to memory 238. Client specific software 536 can be similar to client specific software 236. Communication link 570 can be similar to communication link 270. Hub device 560 can be similar to hub device 260. Communication link 550 can be similar to communication link 250.

In some embodiments, host device 510 can be a personal computer, laptop computer, tablet device, multimedia device, cellular phone, smartphone, global positioning system (GPS) device, gaming device, multi-function device, a smart hub that permits two or more devices to communicate with one another, and/or the like.

In certain embodiments, client device 530 can be any suitable device capable of communicating with a host device without limitation. In some embodiments, a client device can be a tablet device, multimedia device, cellular phone, smartphone, global positioning system (GPS) device, gaming controller or input device, multi-function device, wireless communications device, modem, external speaker, external display, camera, printing device, and/or the like.

In some embodiments, communication link 550 and 570 can each be implemented as a USB cable, serial cable, etc., allowing host, hub and client devices to be connected or disconnected by a user. In certain embodiments, client device 530 can send a request to host device 510 requesting suspension of communication link 550.

It will be appreciated that the systems shown in FIGS. 1-5 are illustrative and that variations and modifications are possible. For example, although only one communication link 150 is shown in FIG. 1, any number of links can be present between host device 110 and client device 130. Illustratively, the host and client devices can be directly connected via a first communication link, which can handle communication of suspension information. The host and client devices can also be directly connected via a second communication link, which can handle all other communications. As another example, a host device can be connected to multiple client devices and/or multiple hub devices. A host device can also include multiple direct and indirect (via hub devices) connections to multiple client devices.

As discussed above, communication between a host device and client device can be facilitated by a communication protocol. In certain embodiments, a communication protocol can define accepted formats, structures, and data requirements for communication between a host device and a client device. For instance, a communication protocol can specify that each message is to be sent in a packet with a header and an optional payload. The header can provide basic information (e.g., a start indicator, length of the packet, and a command code identifying a command to be processed by the recipient), while the payload can provide any data associated with the command; the amount of associated data can differ for different commands, and some commands can provide for variable-length payloads.

In certain embodiments, the communication protocol can define specific commands to indicate an action to be taken by a message recipient, completion of a task, change of state, status information, enumeration information, occurrence of an error, and/or the nature of associated data. In certain embodiments, the communication protocol can be asymmetric or host-centric (e.g., the host device controls communications and transactions). In some embodiments, the communication protocol can allow a communication link to be suspended. In certain embodiments, suspending a communication link causes the communication link to be placed in a low power mode (in which the communication link draws less power than when it is active).

In certain embodiments, communication between a host device and client device can be facilitated by the USB protocol. The USB protocol is an asymmetric or host-centric communication protocol. As such, the host device initiates all transactions. In a typical USB protocol transaction, a first packet, called a token, can be transmitted by the host device to a client device. A token can indicate the type of transaction that is to occur. For example, the USB protocol defines an IN token, which can indicate that the client device is to send data to the host device, and an OUT token, which can indicate that the host device will be sending data to the client device. After a token is sent, a host device or a client device can send an optional data packet. The last packet to be sent (either by a host device or a client device) in a transaction can be a status packet. The status packet can either be an acknowledgement message (ACK) or a negative acknowledgement message (NAK).

The USB protocol specifies that a client device can have one or more configurations. Each configuration defines the type of capabilities supported by the client device. For example, a multi-function client device can have a configuration for an audio function and a configuration for a camera function.

Each configuration can be associated with one or more interfaces. The USB protocol defines several interfaces that can be used by a client device and a host device to communicate certain types of data with one another. For example, an audio interface can be defined for the communication of sound data between a client device and a host device. In some embodiments, a client device can support one or more interfaces depending on the functionality of the client device. Some interfaces specified in the USB standard include audio, human interface device (HID), physical interface device (PID), image, printer, mass storage, communications and CDC control, smart card, content security, video, personal healthcare, wireless controller, application specific, and vendor specific.

Each interface can be associated with one or more endpoints within a client device. These endpoints can be configured to handle data communications at the client device for its associated interface. In particular, a host device can send data to and receive data from the endpoints. As an example, an endpoint can be associated with an audio interface. A host device can send audio information to a client device by sending the audio information to the endpoint associated with the audio interface. Endpoints can be implemented in any suitable manner. For example an endpoint can be a register, a memory buffer, and/or the like.

Figure 6:
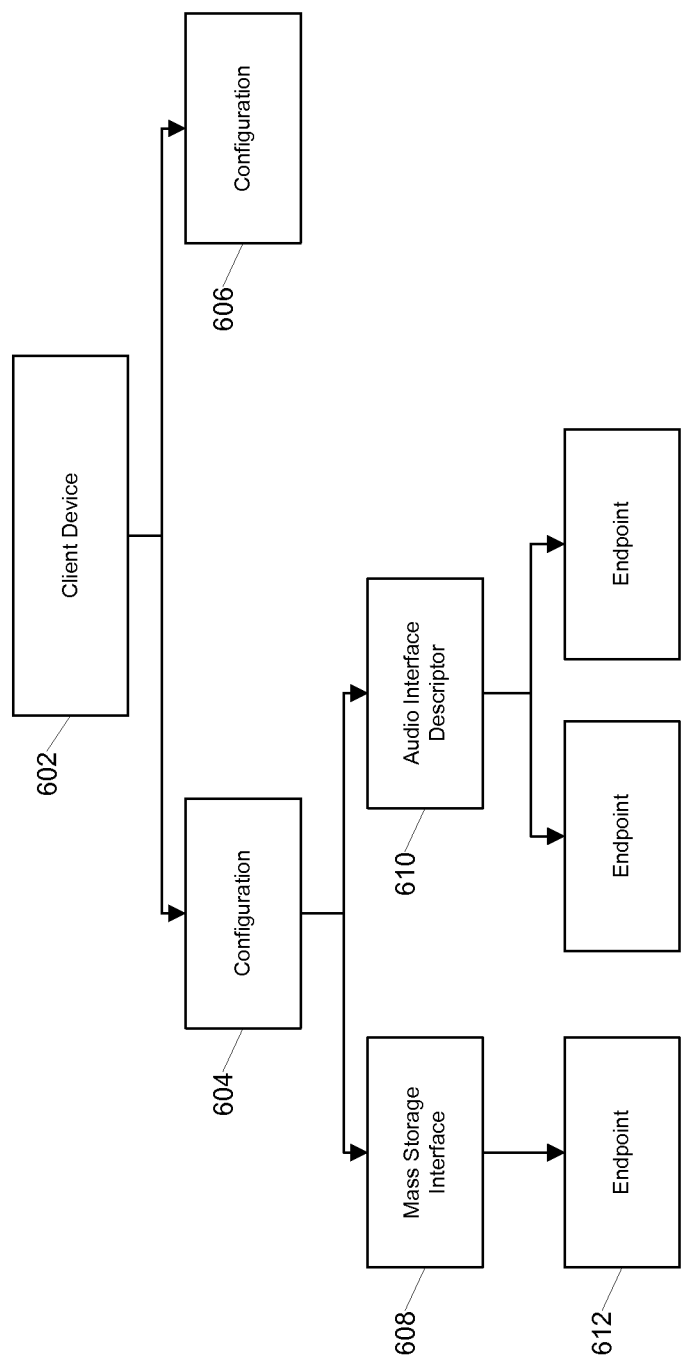
FIG. 6 is a hierarchical diagram showing the relationship between a client device, its configurations, interfaces, and endpoints according to an embodiment of the present invention.

FIG. 6 illustrates a hierarchical diagram showing the relationship between a client device, its configurations, interfaces, and endpoints. In particular, FIG. 6 shows that a client device can be associated with one or more configurations, such as configurations 604 and 606. Each configuration can further be associated with one or more interfaces. For instance, configuration 604 can be associated with interfaces 608 and 610. Each interface can be associated with one or more endpoints. For example, interface 610 can be associated with end point 612.

The logical communication channel between a host device and a client device's endpoint is referred to herein as a communication "pipe." Data transfers over a communication pipe can be based on interrupt, bulk, isochronous, or control type data transfers.

With respect to interrupt type data transfers, a host controller of a host device can be configured to periodically poll or send polling requests to an "interrupt" endpoint of a client device. Polling requests are typically sent as IN tokens. In response to a polling request, a client device can be configured to send interrupt information. For example, during operation, a client device can place or queue an interrupt request on its interrupt endpoint. Upon receiving a polling request, the client device can send the interrupt request to the host device. As another example, the client may not have previously queued an interrupt request on the interrupt endpoint. In this instance, upon receiving a polling request, the client device can sent a NAK message to the host device to indicate that no interrupts have been queued. The host controller of the host device can additionally be configured to receive responses to polling requests (e.g., interrupt requests, NAK messages).

The periodic sending of polling requests and receipt of responses by a host device can occur at the hardware layer. More specifically, the sending of polling requests and receipt of responses can be implemented in the integrated circuit or circuits of a host device. For example, each polling request can be sent by a host controller without being processed at the software layer (i.e. program code e.g., operating system or application executed by a processor of the host device). The host controller can further receive responses to the polling request and determine whether the software layer (e.g., operating system or application executed by the processor) should be notified. In particular, if an interrupt request is received, a notification is sent to the software layer for further processing. If a NAK is received, no notification is sent. It should be noted that initial configuration of the host controller to perform interrupt type data transfers can be performed at the software layer. By permitting the host controller to send polling requests, receive polling responses, and determine if an operating system or application executed by a processor needs to be notified of the response, processing by the processor can be reduced, which can conserve power.

As discussed, the USB protocol is an example of an asymmetric or host-centric communication protocol, in which suspension of a communication link between a host device and a client device is performed solely by the host device. The USB protocol does not permit a client device to suspend a communication link or send a request to its host device requesting suspension of the communication link.

Certain embodiments of the present invention provide a "suspend interface" via which a host device can receive suspension information from a client device. In some embodiments, the suspend interface can be associated with one or more client device endpoints. Data transfers between the host device and the one or more endpoints can occur in any suitable manner. For example, data transfers can be based on interrupt type transfers. As such, a host controller of the host device can poll the one or more "interrupt" endpoints associated with the suspend interface at regular or semi-regular intervals. If a suspend request (i.e. an interrupt request) was previously placed or queued on one of the one or more interrupt endpoints, the suspend request can then be sent to the host controller.

Figure 7:
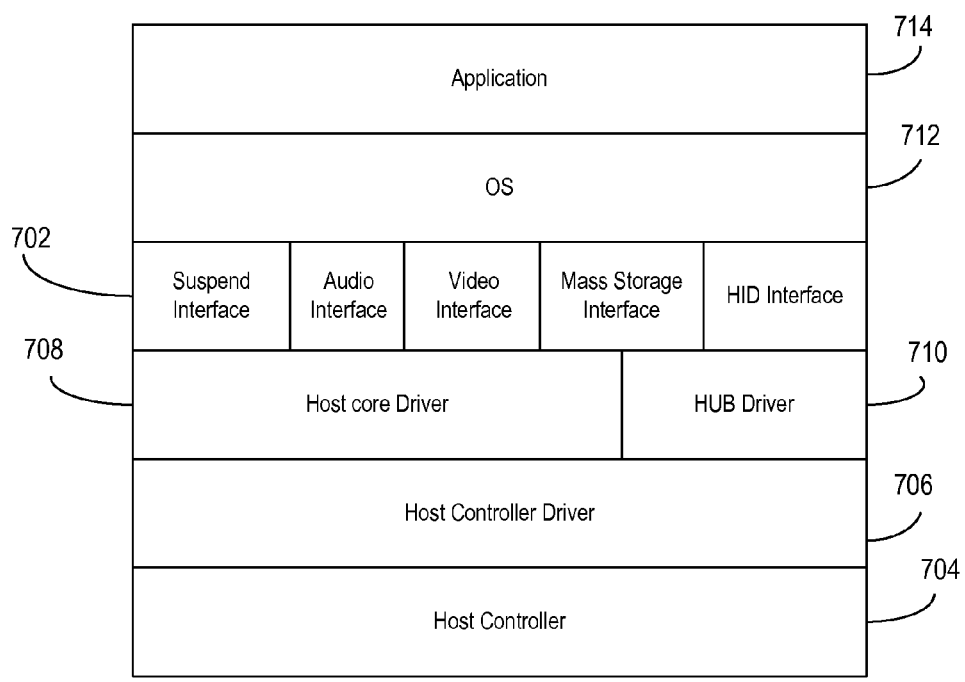
FIG. 7 illustrates a modified USB host stack according to an embodiment of the present invention.

FIG. 7 illustrates a block diagram of a modified USB host stack 700 that can include a suspend interface 702 according to an embodiment of the present invention. USB stack 700 can include a USB host controller 704 that can connect a client device to the host device. A host device can have multiple host controllers and each host controller can be connected to one or more client devices. The USB host controller 704 can communicate with operating system 712 and application 714 through host controller driver 707, host core driver 708, and HUB driver 710. In some embodiments, the USB host controller 704 can be configured to send polling requests to a connected client device. The USB host controller 704 can additionally receive suspension information (e.g., suspend requests, NAK messages) in response to the polling requests. The sending of requests and receipt of suspension information can be carried out by the USB host controller 704 without communication with or processing by operating system 712 or application 714. If a response indicates that an action is to be taken (e.g., a communication link is to be suspended), the USB host controller can thereafter notify operating system 712 or application 714 of the response. Standard implementations of USB host stack components can be used, e.g., implementations compliant with "Universal Serial Bus Specification," version 2.0 dated Apr. 27, 2000.

Examples of processes that can be used to communicate suspension information from a client device to a host device, and to enable the host device to initiate a suspension of a communication link will now be described.

Figure 8:
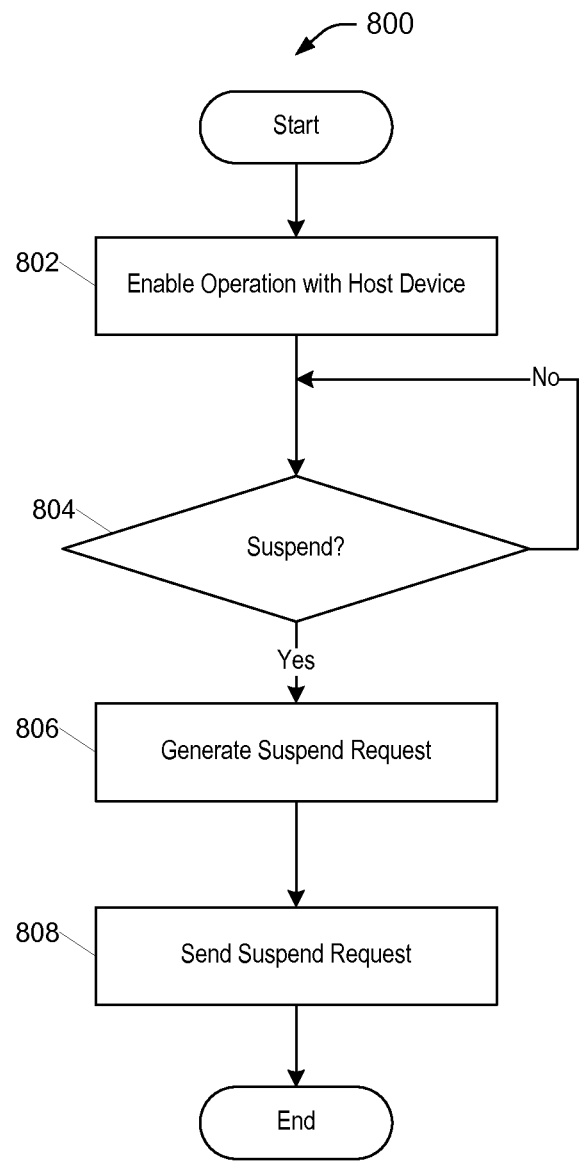
FIG. 8 is a flow diagram of a process usable by a client device for interfacing with a host device according to an embodiment of the present invention.
Figure 9:
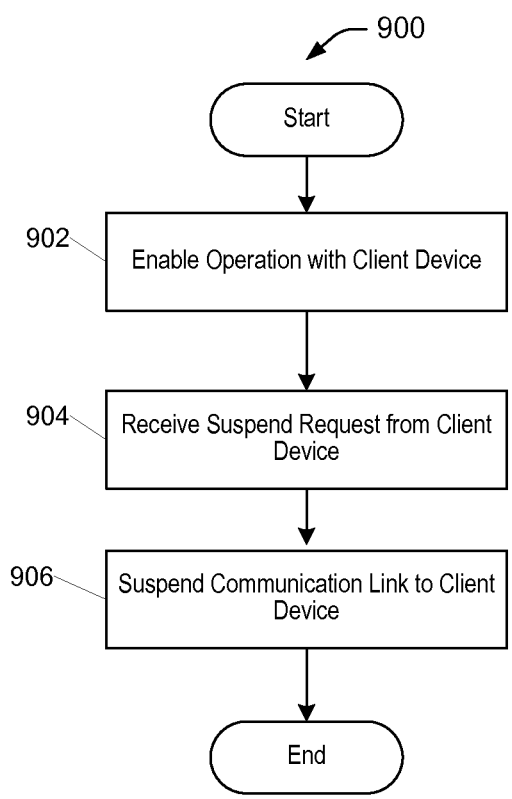
FIG. 9 is a flow diagram of a process usable by a host device for interfacing with a client device according to an embodiment of the present invention.

FIGS. 8 and 9 show processes that can be performed by a client device and a host device respectively according to an embodiment of the present invention.

FIG. 8 is a flow diagram of a process 800 for interfacing with a host device according to an embodiment of the present invention. Process 800 can be performed by, e.g., client device 130 of FIG. 1. Communication among the various entities in process 800 can be facilitated by any suitable communication protocol, such as the USB protocol.

At block 802, client device 130 can enable operation with host device 110. Operation can be enabled in any suitable manner. For example, client device 130 can exchange configuration information with host device 110. In some embodiments, the configuration information can specify the functions supported by client device 130. For instance, the configuration information can specify that client device 130 is capable of accessing a mobile telephone network. In some embodiments, the configuration information can indicate that client device 130 supports communication of link suspension information.

At block 804, client device 130 can determine whether suspension of its communication link (i.e., communication link 150) with host device 110 is appropriate. Client device 130 can make such a determination in any suitable manner and using any suitable criteria. For example, client device 130 can determine whether suspension is appropriate based on the length of time it has been idle, current environmental conditions, past usage patterns, predicted future usage patterns, current or future client device state (e.g., suspended mode), and/or the like.

If suspension is appropriate then at block 806, client device 130 can generate a suspension notification or request indicating that communication link 150 be suspended. In some embodiments, the notification or request can additionally include a delay period value. The delay period value can indicate a duration of time for which host device 110 should wait prior to suspending communication link 150. For example, a delay period value can specify that host device 110 should wait 1 ms before initiating suspension of communication link 150. At block 808, client device 130 can send the suspension notification or request to host device 110. In some embodiments, the suspend request can be sent in response to a previously received polling request from host device 110.

FIG. 9 is a flow diagram of a process 900 for interfacing with a client device according to an embodiment of the present invention. Process 900 can be performed by, e.g., host device 110 of FIG. 1. Communication among the various entities in process 900 can be facilitated by any suitable communication protocol, such as the USB protocol.

At block 902, host device 110 can enable operation with client device 130. Operation can be enabled in any suitable manner. For example, host device 110 can exchange configuration information with client device 130. The configuration information can indicate, among other things, that client device is capable of providing suspend requests e.g., via a suspend interface. Based on the configuration information, the client and host devices can be configured to communicate with one another. For instance, host device 110 can download and configure software drivers for client device 130. Once operation is enabled, host device 110 can use the capabilities of client device 130. For example, host device 110 can use the capabilities of client device 130 to access a WiFi network.

At block 904, host device 110 can receive a suspend request from client device 130. At block 906, host device 110 can suspend communication link 150. In some embodiments, suspending communication link 150 can include placing the communication link in a low power mode. In certain embodiments, the suspend request can further include a delay period value. Based on the delay period value, host device 110 can wait a period of time prior to suspending communication link 150. After a communication link is suspended, it can be reactivated or "woken-up" in any suitable manner. For example, a communication link can be "woken-up" by a host device and/or a client device according to the "Universal Serial Bus Specification," version 2.0 dated Apr. 27, 2000.

Figure 10:
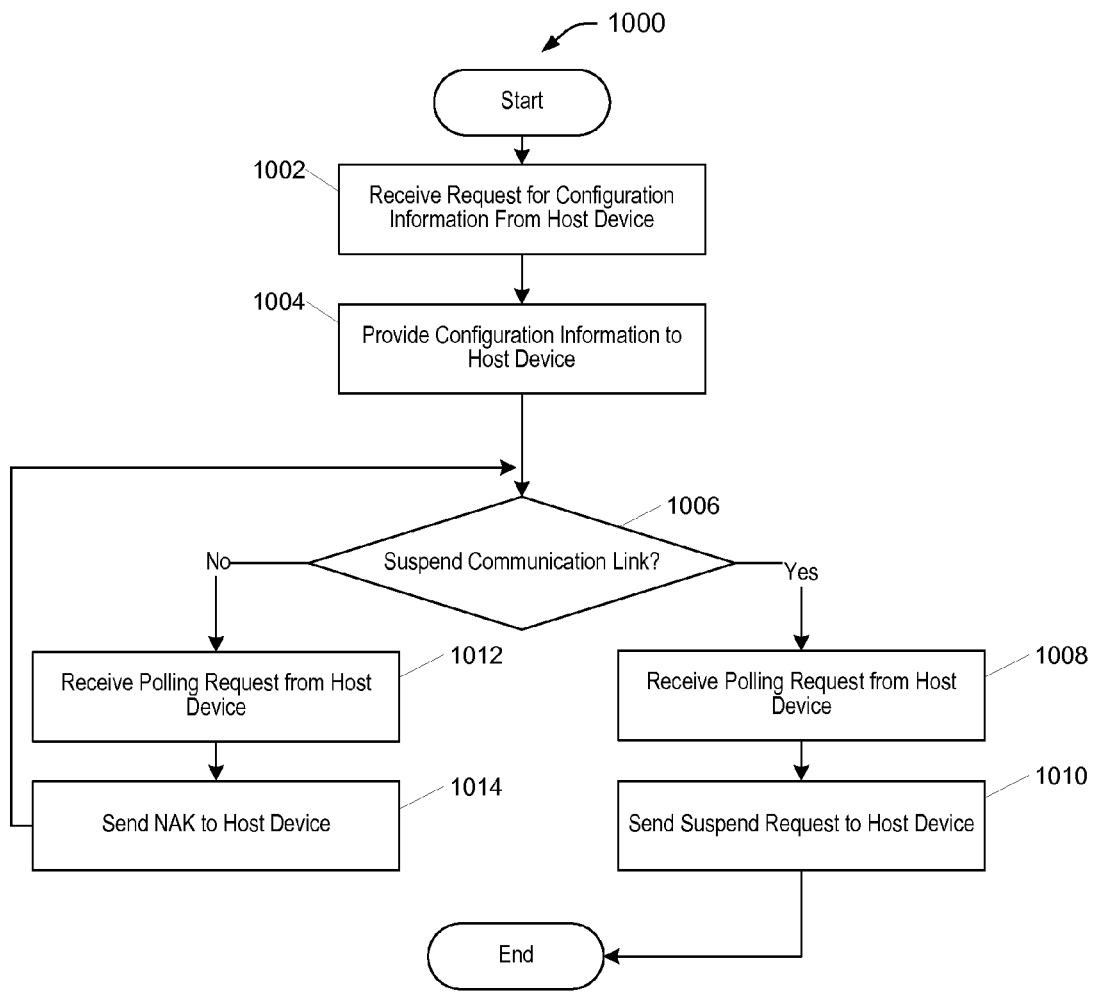
FIG. 10 is a more detailed flow diagram of a process usable by a client device for interfacing with a host device according to an embodiment of the present invention.
Figure 11:
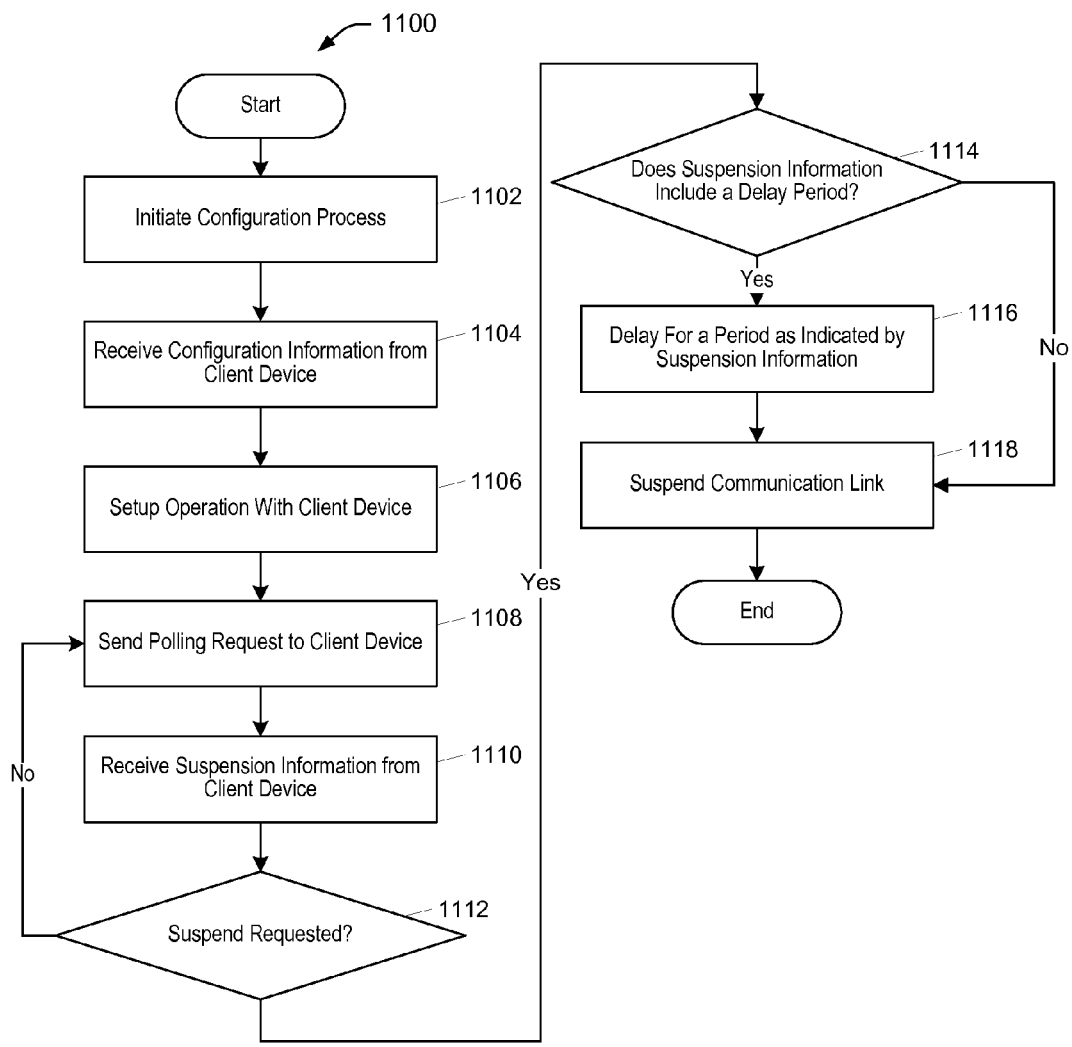
FIG. 11 is a more detailed flow diagram of a process usable by a host device for interfacing with a client device according to an embodiment of the present invention.

Further understanding of the present invention can be had by examining the more detailed processes shown in FIGS. 10 and 11.

FIG. 10 is a flow diagram of a process 1000 for interfacing with a host device according to an embodiment of the present invention. Process 1000 can be performed by e.g., client device 130 of FIG. 1. Communication among the various entities in process 1000 can be facilitated by the USB protocol. It will be appreciated that while the following process is described primarily in terms of devices communicating based on the USB protocol, this context is merely illustrative, and embodiments of the present invention may be applied to other communication protocols.

In some embodiments, configuration information can be exchanged between client device 130 and host device 110. The exchange of configuration information can be implemented according to a communication protocol, such as the USB protocol. Referring to FIG. 10, client device 130 can receive a request for configuration information from host device 110 at block 1002. Client device 130 can thereafter provide configuration information to host device 110 at block 1004.

In certain embodiments, the configuration information can include enumeration information. The enumeration information can be implemented according to any suitable communication protocol, such as the USB protocol. In some embodiments, the enumeration information (or other configuration information) can include descriptors defining the configurations, interfaces and endpoints supported by client device 130.

In certain embodiments, the enumeration information can include a descriptor defining a suspend interface, which can be used to communicate suspension information. In some embodiments, the enumeration information can further include endpoint descriptors defining one or more endpoints associated with the suspend interface. The endpoint descriptors can include endpoint address information, transfer type information (e.g., interrupt) and polling interval information.

After sending configuration information to host device 110, client device 130 can receive a configuration value from host device 110. The configuration value can indicate that client device 130 and host device 110 are enabled for operation. After operation is enabled, client device 130 can exchange suspension information with host device 110 via an interrupt endpoint associated with the suspend interface defined in client device 130's enumeration information.

At block 1006, client device 130 can determine if suspension of communication link 150 is appropriate. Determination of whether communication link 150 is to be suspended can occur in any suitable manner. For instance, client device 130 can determine whether a communication link should be suspended based on past usage patterns, current environmental conditions, predicted future usage patterns, period the communication link has been idle (e.g., no data has been transferred to host device 110), current or future client device state (e.g., suspended mode), and/or the like. For example, client device 130 can provide access to a mobile telephone network. During operation, client device 130 can determine that it has been idle (e.g., not transferring data to or from the mobile telephone network) for a period in excess of a certain threshold period. As a result, client device 130 can determine that, due to its current idle state, suspension of communication link 150 is appropriate.

In some embodiments, determination of whether suspension is appropriate can occur automatically at regular or semi-regular intervals. For example, client device 130 can perform a suspension determination automatically every 1 ms. In some embodiments, a suspension determination can be initiated manually or triggered by the occurrence of an event. For example, a user can manually press a button to initiate a suspension determination. In some embodiments, if client device 130 determines that suspension is appropriate, client device 130 can queue an interrupt (e.g., a suspend request). For example, client device 130 can generate a suspend request and place the request on an endpoint associated with the suspend interface.

At block 1008/1012, client device 130 can receive a polling request from host device 110. In some embodiments, the polling request can be received by client device 130 at a time based on a predefined polling interval. As discussed, the polling interval can be defined by the one or more endpoint descriptors provided during configuration.

Upon receiving a polling request, client device 130 can send suspension information to host device 110. The suspension information can be based on the suspension determination performed by client device 130 at block 1006. For example, If client device 130 previously determined at block 1006 that communication link 150 should be suspended (i.e. an interrupt was queued), client device 130 can send a suspend request indicating that host device 110 suspend communication link 150 (block 1010). In some embodiments, the suspend request may have been previously queued by client device 130. In some embodiments, the suspension notification or request can include a delay period value. The delay period value can indicate an amount of time that host device 110 is to wait before suspending communication link 150. In some embodiments, the suspend request can be sent in a data packet formatted according to the USB protocol.

If client device 130 previously determined at block 1006 that communication link 150 should not be suspended (i.e. an interrupt was not queued), client device 130 can send suspension information to host device 110 indicating that the communication link should not be suspended (block 1014). In some embodiments, the suspension information can include a "NAK" message.

FIG. 11 is a flow diagram of a process 1100 for interfacing with a client device. Process 1100 can be performed by, e.g., host device 110 of FIG. 1. Communication among the various entities in process 1100 can be facilitated by the USB protocol. It will be appreciated that while the following process is described primarily in terms of devices communicating based on the USB protocol, this context is merely illustrative, and embodiments of the present invention may be applied to other communication protocols.

At block 1102, host device 110 can initiate a configuration process (e.g., exchange of configuration information) with client device 130. In certain embodiments, the configuration process can be implemented according to a communication protocol, such as the USB protocol. In some embodiments, a triggering event can cause host device 110 to initiate the configuration process. For example, physically coupling client device 130 to host device 110 can trigger host device 110 to initiate the configuration process. As another example, host device 110 and client device 130 may have been previously coupled during the manufacturing process (e.g., host and client device components that are integrated into a smartphone). As such, powering on the devices can trigger host device 110 to initiate the configuration process. In some embodiments, the configuration process can include host device 110 sending a request for configuration information to client device 130.

At block 1104, host device 110 can receive configuration information from client device 130. In certain embodiments, the configuration information can include enumeration information. For example, enumeration information structured and formatted according to the USB protocol can be provided to host device 110. The enumeration information (or other configuration information) can include descriptors defining the interfaces and endpoints supported by client device 130.

In certain embodiments, the enumeration information can include a descriptor defining a suspend interface. In some embodiments, the enumeration information can further include endpoint descriptors associated with the suspend interface descriptor. The endpoint descriptors can include endpoint address information, transfer type information (e.g., interrupt) and polling interval information.

At block 1106, host device 110 can be set up to operate with client device 130 based on the configuration information. For example, software drivers can be loaded on host device 110 to access the functionality of client device 130, communication pipes (based on identified endpoints, transfer types, and polling intervals) for various interfaces can be configured, a unique 7-bit address can be assigned to client device 130, and/or the like.

In certain embodiments, a suspend interface can be configured for communicating suspension information. In some embodiments, the suspend interface can be configured based on the suspend interface and endpoint descriptors provided by client device 130. In some embodiments, communications over the suspend interface can be based on interrupt type data transfers. For example, client device 130 can place a suspend request to be sent to host device 110 on one of its endpoints. Upon receiving a polling request for the endpoint, client device 130 can send the suspend request to host device 110.

At block 1108, host device 110 can send, via host controller 120, a polling request to client device 130 requesting suspension information. In certain embodiments, host device 110 can send a polling request to an endpoint of client device 130 that is associated with the suspend interface. The polling request can be sent based on a predefined polling interval. For example, host device 110 can send polling requests at 500 μs intervals based on the endpoint descriptors received from client device 130 at block 1104. In some embodiments, host controller 120 can send the polling request at the hardware layer.

At block 1110, host controller 120 of host device 110 can receive suspension information from client device 130. At block 1112, host controller 120 can determine whether suspension information received from client device 130 indicates that communication link 150 should be suspended. In some embodiments, host controller 120 can make such a determination at the hardware layer.

If suspension is indicated, host controller 120 can notify processor 116 (e.g., by notifying an operating system or application executed by processor 116) that client device 130 has requested that communication link 150 be suspended. In some embodiments, host controller 120 or processor 116 can also determine if the suspend request includes a delay period value (block 1114) If the suspend request includes a delay period value, host device 110 can wait a period of time, as indicated by the delay period value, before initiating suspension of the communication link 150 (block 1116). At block 1118, processor 116 can suspend communication link 150. Suspension of the communication link can occur in any suitable manner. For example, suspension can be performed in compliance with the "Universal Serial Bus Specification," version 2.0 dated Apr. 27, 2000. After a communication link is suspended, it can be reactivated or "woken-up" in any suitable manner. For example, a communication link can be "woken-up" by a host device and/or a client device according to the "Universal Serial Bus Specification," version 2.0 dated Apr. 27, 2000.

If suspension of the communication link is not indicated, host controller 120 can continue to periodically send polling requests to client device 130. In certain embodiments, if the suspension information indicates that suspension is not to occur, host controller 120 does not notify processor 116 that such an indication was received.

Figure 12:
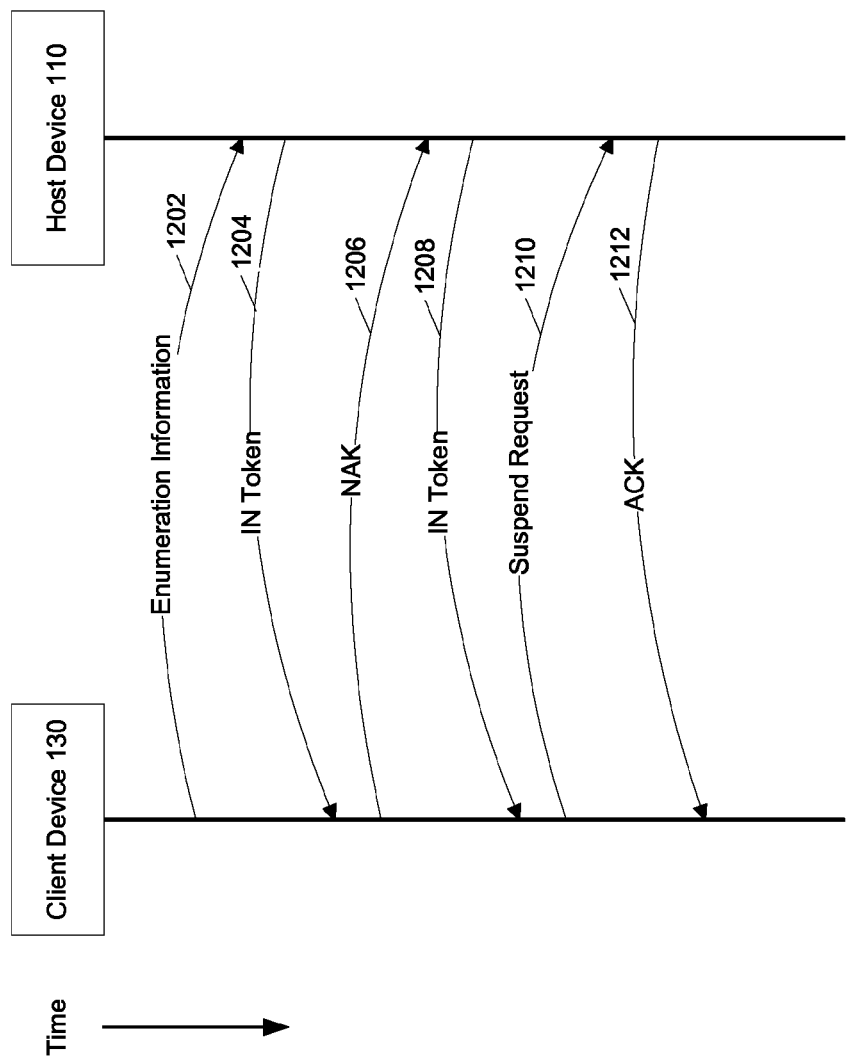
FIG. 12 is a ladder diagram illustrating an example sequence of communications between a host device and a client device according to an embodiment of the present invention.

By way of further illustrating communication between a host and client device, FIG. 12 shows a ladder diagram illustrating an example sequence of communications carried out between the host and client devices shown in FIG. 1 according to an embodiment of the present invention. It will be appreciated that while the following example is described primarily in terms of devices communicating based on the USB protocol, this context is merely illustrative, and embodiments of the present invention may be broadly applied to other communication protocols. Furthermore, one of ordinary skill in the art will recognize that the communications shown in FIG. 12 can also be carried out between the host and client devices shown in FIGS. 2-5.

At communication 1202, enumeration information can be provided to host device 110. At communication 1204, host controller 120 of host device 110 can transmit a first polling request to client device 130. The request can be sent at a time based on a polling interval specified by the enumeration information. In some embodiments, the polling request can be an IN token. At communication 1206, client device 130 can transmit a NAK in response to the request. The NAK can signal to host controller 120 that a suspension of the communication link is not requested. At communication 1208, host controller 120 can transmit a second polling request to client device 130. In response, client device 130 can send a suspend request to host device 110 at communication 1210. In some embodiments, the suspend request can be a data packet formatted according to the USB protocol. At communication 1212, host controller 120 can transmit an ACK indicating that the suspend request was successfully received (e.g., the request/notification is not corrupt). The sequence of communications shown in FIG. 12 are illustrative. Other communications can occur while the communication link between host device 110 and client device 130 is active.

Figure 13:
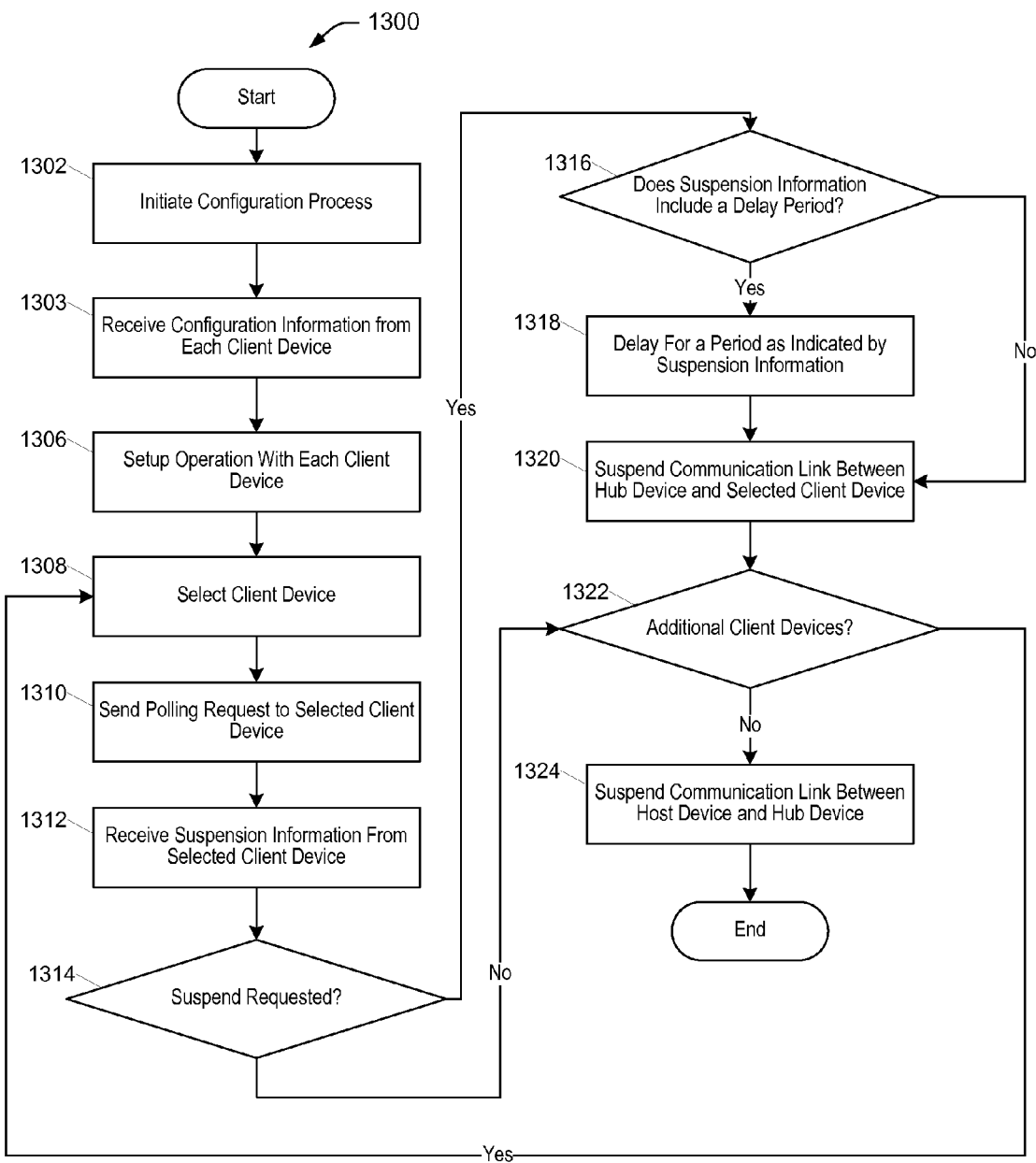
FIG. 13 is a flow diagram of a process usable by a host device for interfacing with a client device via a hub device according to an embodiment of the present invention.

FIG. 13 shows a process that can be performed by a host device communicating to a client device via a hub device according to another embodiment of the present invention. It should be appreciated that the corresponding process performed by a client device in communicating with a host device via a hub device can be similar to the process shown in FIG. 10.

As discussed, FIG. 13 illustrates a flow diagram of a process usable by a host device to interface with a client device according to an embodiment of the present invention. Process 1300 can be performed by e.g., host device 210 of FIG. 2. Communication among the various entities in process 1300 can be facilitated by the USB protocol. It will be appreciated that while the following process is described primarily in terms of devices communicating based on the USB protocol, this context is merely illustrative, and embodiments of the present invention may be broadly applied to other communication protocols.

Blocks 1302-1306 and 1310-1318 can be similar to blocks 1102-1106 and 1108-1116 of process 1100 except that communications between host device 210 and client device 230 can flow through first communication link 270, hub device 260, and second communication link 250 instead of via communication link 150. Additionally, a suspend request received from the client device 230 can request suspension of second communication link 250 instead of communication link 150.

In some embodiments, a host device 210 can be connected to multiple client devices via hub device 260. At block 1308, host device 210 can select a client device (e.g., client device 230) that currently has an active communication link with hub device 260. At block 1320, host device 210 can suspend second communication link 250. At block 1322, host device 210 can determine whether hub device 260 currently has any connected client devices with active communication links (i.e. links that are not suspended or powered-down). If host device 210 determines hub device 260 does not include any active communication links with connected client devices, host device 210 can suspend communication link 270 at block 1324. Such a suspension can be referred to as a "global suspend." After a communication link is suspended, it can be reactivated or "woken-up" in any suitable manner. For example, a communication link can be "woken-up" by a host device and/or a client device according to the "Universal Serial Bus Specification," version 2.0 dated Apr. 27, 2000.

It should be appreciated that the processes shown in FIGS. 8-11 and 13 are illustrative and that variations and modifications are possible. Blocks described as sequential can be executed in parallel, order of blocks can be varied, and blocks can be modified, combined, added, or omitted. Furthermore, one of ordinary skill in the art will recognize that the processes shown in FIGS. 8-11 and 13 can be implemented for other client devices and/or host devices, such as the client and host devices shown in FIGS. 3, 4 and 5.

While the invention has been described with respect to specific embodiments, variations are possible. For example, host and client devices can be components (e.g., one or more integrated circuits on a single PCB, separate components on different PCBs) of a portable computing device (e.g., a smartphone) that can communicate over the USB protocol or any other asymmetric communication protocol where only one device (e.g., host device) can suspend a communication link. Host and client devices can be connected via any suitable connection types, including a USB HSIC connection, traditional USB connection, or any other connection type for facilitating communications using an asymmetric communication protocol. A host device can additionally be directly connected to and/or indirectly connected to (via one or more hub devices) one or more client devices. As another example, suspension information can include a suspension duration, which can indicate the amount of time for which a communication link should stay suspended.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes can use different techniques, or the same pair of processes can use different techniques at different times. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable storage media; suitable media include magnetic disk or tape, optical storage media such as compact disk (CD) or DVD (digital versatile disk), flash memory, and the like. Computer readable media encoded with the program code can be packaged with a compatible electronic device, or the program code can be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. A method of operating a client device, the method comprising, by the client device:
enabling operation with a host device via a communication link, wherein operation is carried out according to a communication protocol;
determining, by the client device, whether suspension of an active communication link is appropriate;
if the client device determines that suspension of the active communication link is appropriate, placing, by the client device, an interrupt request on an interrupt endpoint of the client device;
receiving a polling request from the host device, wherein the polling request is received at the interrupt endpoint of the client device; and
when an interrupt request is placed on the interrupt endpoint, sending, from the client device to the host device, a suspension request for the host to suspend the active communication link.

2. The method of claim 1, wherein the communication protocol is asymmetric.

3. The method of claim 1, wherein the communication protocol is the universal serial bus (USB) protocol.

4. The method of claim 1, wherein the communication link is implemented according to the USB high speed inter-chip (HSIC) standard.

5. The method of claim 1, wherein the suspension request further includes a delay period value, wherein the delay period value indicates a period of time the host device is to wait prior to suspending the communication link.

6. A computer-readable storage medium containing program instructions that, when executed by a client device, cause the client device to execute a method comprising:
providing enumeration information to a host device according to a communication protocol, wherein operation with the host device is enabled based on the enumeration information;
determining, by the client device, whether suspension of a communication link between the host and client device is appropriate;
in the event that suspension of an active communication link is appropriate, as determined by the client device, placing, by the client device, an interrupt request on an interrupt endpoint of the client device;
receiving a polling request from the host device, wherein the polling request is received at an interrupt endpoint of the client device; and
when an interrupt request is placed on the interrupt endpoint, transmitting, from the client device to the host device, a suspend request for the host to suspend the active communication link.

7. The computer-readable storage medium of claim 6, wherein the enumeration information includes a suspend interface descriptor and an endpoint interface descriptor associated with the suspend interface descriptor, wherein the endpoint interface descriptor specifies an endpoint and indicates that communications with the endpoint is to be based on interrupt type data transfers.

8. The computer-readable storage medium of claim 6, wherein the suspend request indicates a time at which the host device is to initiate suspension of the communication link.

9. A method of operating a host device, the method comprising, by the host device:
   enabling operation with a client device via a communication link, wherein communications are carried out according to a communication protocol;
   sending a polling request to an interrupt endpoint of the client device;
   receiving a suspend request for the host to suspend an active communication link from the interrupt endpoint of the client device, wherein the suspension request is received by the host when the client device has determined that suspension of the active communication link is appropriate ; and
   suspending the active communication link to the client.

10. The method of claim 9, wherein the communication protocol is the universal serial bus (USB) protocol.

11. The method of claim 9, wherein the polling request is sent at a hardware layer.

12. The method of claim 9, wherein the polling request is sent by a universal serial bus host (USB) controller of the host device without the aid of a processor of the host device.

13. The method of claim 9, wherein enabling operation with the client device includes receiving, from the host device, a suspend interface descriptor and one or more endpoint interface descriptors associated with the suspend interface descriptor, wherein the one or more endpoint interface descriptors specify one or more endpoints and indicate that communications with the one or more endpoints are to be based on interrupt type data transfers.

14. A host device comprising:
   a host controller;
   a processor coupled to the host controller; and
   a memory device coupled to the processor;
   wherein the host controller is configured to:
      transmit a polling request to an interrupt endpoint of a client device after a time interval;
      receive a suspend request from the interrupt endpoint of the client device in response to the polling request, wherein the suspend request is a request for the host to suspend an active communication link;
      notifying the processor that the client device has requested suspension of the active communication link; and
   wherein the processor is configured to:
      suspend the active communication link to the client device in response to the notification from the host controller.

15. The host device of claim 14, wherein the communication link is implemented according to USB high speed inter-chip (HSIC) standard.

16. The host device of claim 14, wherein suspending the communication link includes placing the communication link in a low power mode.

17. The host device of claim 14, wherein the host controller is configured to send the polling request at a time based on a predefined polling interval.

18. The host device of claim 14, wherein the processor is further configured to:
   suspend the communication link to the client device after waiting a period of time, wherein the period of time is indicated by a delay period value included in the suspension information.

19. A system comprising:
   a client device configured to:
      determine whether suspension of an active communication link is appropriate;
      if the client device determined that suspension of the active communication link is appropriate, placing, by the client device, an interrupt request on an interrupt endpoint of the client device;
      when an interrupt request is placed on the interrupt endpoint, generating, by the client device, a suspend request for the host to suspend the active communication link; and
   a host device configured to:
      transmit a polling request to an interrupt endpoint of the client device;
      receive the suspend request from the client device in response to the polling request; and
      suspend the active communication link in response to the suspend request.

20. The system of claim 19, wherein the communication protocol is the universal serial bus (USB) protocol.

21. The system of claim 19, wherein the host device and the client device are integrated circuits on a single printed circuit board.

* * * * *